March 9, 1965     W. B. SHUCK     3,172,746
FILTER CONDITION INDICATOR
Filed Aug. 31, 1961
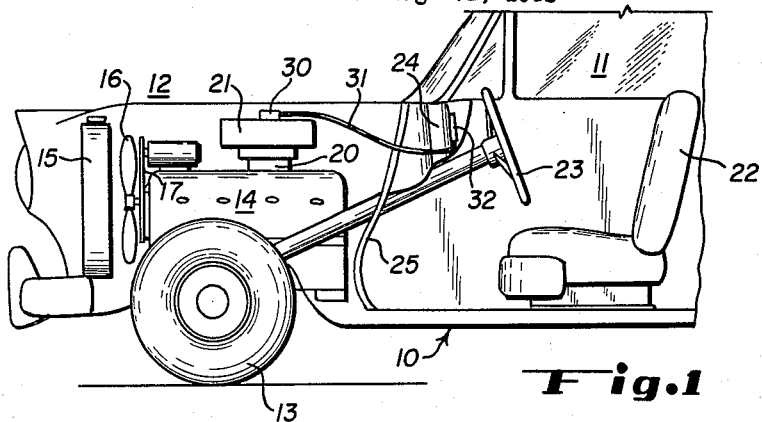
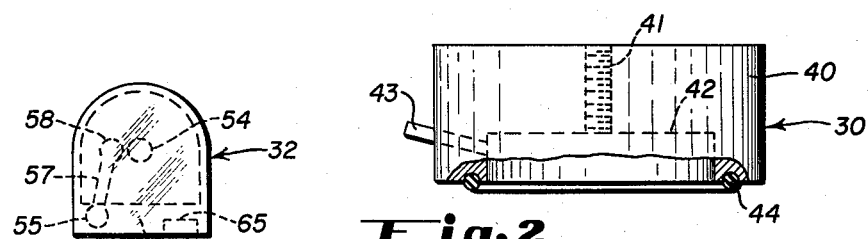
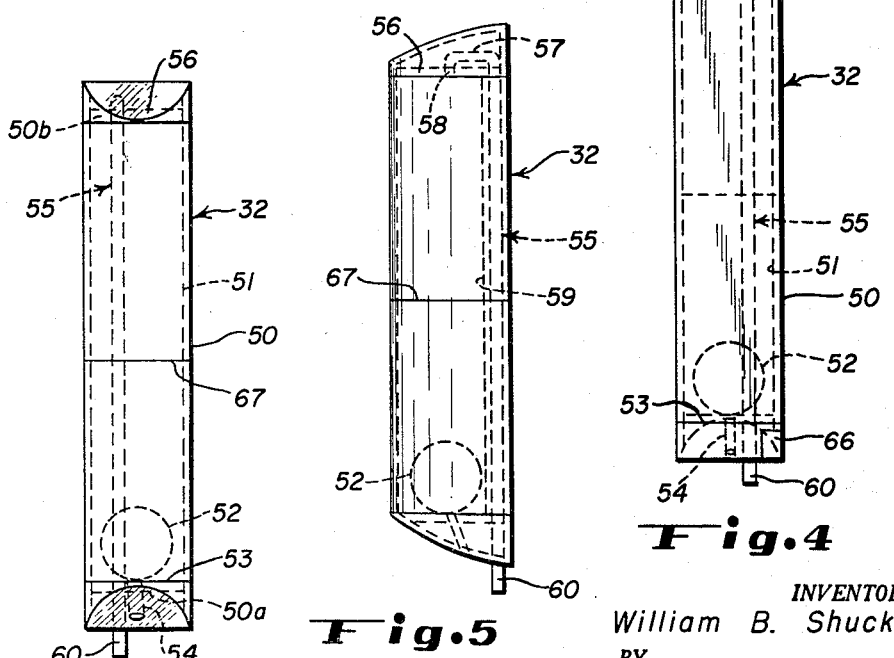
INVENTOR.
William B. Shuck
BY
ATTORNEYS

United States Patent Office 3,172,746
Patented Mar. 9, 1965

3,172,746
FILTER CONDITION INDICATOR
William B. Shuck, 1011 Hancock, Laramie, Wyo.
Filed Aug. 31, 1961, Ser. No. 135,353
3 Claims. (Cl. 55—274)

This invention relates to attachments for internal combustion engine induction systems; and more particularly it relates to apparatus for continuously sensing and indicating flow conditions of air induction systems of operating internal combustion engines of the type used in motor vehicles.

It is the usual practice to periodically check the oil system of internal combustion engines as a preventive maintenance procedure. To this end, the practice has been that the filtering medium (where necessary) and engine oil be replaced on a regular schedule. However, the air induction system and its filtering medium are usually neglected until difficulty and malfunction of the engine suggest that the air system is no longer serviceable.

Malfunction of an engine quite frequently results from clogging of its filtering medium. Particularly in dry and dusty areas the air induction system and its filtering medium become rapidly unserviceable and, unless this condition is corrected, gas consumption is increased and engine roughness and other related difficulties soon appear. Accordingly, it is an object of this invention to provide apparatus for sensing and indicating the operating condition of air induction systems of internal combustion engines.

Another object of the invention is to provide apparatus for continuously sensing and indicating the flow conditions of induction systems of operating internal combustion engines of the type normally used in motor vehicles.

And it is yet another object of the invention to provide simple, inexpensive and easily installed apparatus for continuously sensing and indicating the condition of the filtering medium of an air induction system of the type used with internal combustion engines.

Briefly, in one embodiment, sensing and indicating apparatus embodying the concepts of this invention includes two main parts interconnected by a flexible conduit. One portion is an adapter having an internally threaded central aperture and which is adapted to replace the wing nut normally used to hold the air filter casing and its filtering medium in place over the air inlet of a carburetor of an internal combustion engine. There is a loose fit between filter casing and the retaining stud so that air may pass therebetween and draw air through the adapter. The other portion of the apparatus is an indicating device which includes a movable indicator element viewable through a transparent portion of the indicating device. Movement of the indicator element is indicative of the pressure drop in the air induction system and of the condition of the filter medium.

Another feature of the invention is that the indicating device is easily mounted on the dashboard of a motor vehicle or other easily seen place in an operator compartment. When so placed, continuously sensed information relative to flow conditions in the filter medium is visible to the operator.

Other objects and further features and advantages of apparatus constructed according to this invention will become apparent from the following description, with reference to drawings in which like reference numerals are used to designate like parts in the several views.

In these drawings:

FIG. 1 is a fragmentary side elevation, partially broken away, of an automobile utilizing sensing and indicating apparatus according to the invention installed thereon;

FIG. 2 is a side elevation in partial section of the adapter portion of the sensing and indicating apparatus of FIG. 1;

FIG. 3 is a top view of the indicating portion of the sensing and indicating apparatus;

FIG. 4 is a back view of the apparatus of FIG. 3;

FIG. 5 is a side view of the apparatus of FIG. 3; and

FIG. 6 is a front view of the apparatus of FIG. 3.

In the drawings, and for purposes of explanation, the internal combustion engine of an automobile shown in general by numeral 10 is shown with indicating and sensing apparatus according to the invention mounted thereon. Such an automobile usually includes a passenger compartment 11 with a forward engine compartment 12. Within the engine compartment and mounted above the wheels 13 is an internal combustion engine 14, having the usual cooling arrangement including a radiator 15, fan 16 and associated engine-driven fan belt 17 interconnected therewith. Mounted on engine 14 is a carburetor 20, above which is mounted an air cleaner housing 21. Such air cleaner must include some sort of filter medium, as is well known in the art.

A forward portion of the passenger compartment has a seat 22 placed in position for operator access to a steering wheel 23 and other driving controls. Forwardly of the steering wheel and in place for easy operator view is a dashboard 24. The passenger compartment 11 and the engine compartment 12 are separated by a fire wall 25, usually fabricated of insulating material in order to prevent undesirable radiation of heat from the engine compartment to the passenger compartment.

Apparatus according to the invention includes two portions, one of which is an adapter 30 arranged to replace the wing nut normally used in an automobile to hold the air filter housing 21 in place. The adapter is interconnected by a flexible tube or conduit 31 through the fire wall 25 to an indicating device 32 mounted on or otherwise attached to the dashboard 24.

The adapter is comprised of an outer casing 40 having an internally threaded passage 41 passing therethrough which is adapted for threading engagement on the externally threaded stud passing through filter housing 21 from the carburetor. Formed through the lower portion of adapter casing 40 is a downwardly opening chamber 42. Opening from chamber 42 and through a side wall of casing 40 is a nipple 43 fabricated of copper tubing or the like. Mounted peripherally of the chamber 42 and in a groove formed therein is an O-ring seal 44. In use, the adapter casing is threaded on the stud passing through the air cleaner until O-ring 44 forms a gas-tight seal with the air cleaner housing.

One end of the flexible conduit 31 is mounted on nipple 43 while the other end is attached to the indicating device 32.

The indicating device 32 is comprised of an elongated transparent body 50 having an elongated tubular chamber 51 formed centrally thereof and extending substantially the longitudinal extent of body 50. Mounted within chamber 51 is a lightweight, spherical member or ball 52. The ball has been substantially the same diameter as chamber 51 but sufficiently smaller to provide free movement longitudinally thereof. Opening through a lower end cap 53 mounted on extension 50 of chamber 51 and communicating with the atmosphere is a short passage 54. A longer conduit 55 through back wall 59 communicates with passages 57 and 58 in the opposite end cap 56 above the spherical member 52. Cap 56 is mounted on extension 50b of the body 50. A terminal passage portion or nipple 60 protrudes from the cap 53 and communicates with passage 55. Terminal portion 60 is arranged to be interconnected with one end of flexible conduit 31, thereby forming a communication between chamber 51 and chamber 42 of adapter 30.

Adjacent opposite end portions of body 50 in the back wall thereof are small magnets 65 and 66 which are adapted to hold the device on the dashboard of passenger compartment 11 or on an adjacent metal portion within the sight of an operator. The front face and side portions of the body 50 may be coded. Preferably, this is done by different coloring of the top and bottom portions, on either side of line 67, to indicate extent of clogging.

In use, with the terminal portion 60 of conduit 55 attached to one end of flexible conduit 31 and the other end thereof attached to nipple 43 of adapter 30, reduced pressure, or vacuum in the filtering medium which progressively increases as the filtering medium becomes clogged, is applied above the spherical member 52. Chamber 42 opens into the carburetor side of the filter, and since a clean filter is the least line of resistance, very little suction will be impressed over the indicator. As the filter clogs, more suction is impressed on the indicator. Since the conduit 54 opens to the atmosphere, increased section on the indicator causes the spherical member to rise in chamber 51.

In the exemplary arrangement of the drawings, as long as spherical member 52 is below line 67, the condition of the air filter is satisfactory. However, when the spherical member rises above line 67, the filtering media is dirty and too clogged for good operation of the engine and should be replaced. In practice, a plurality of legends may be applied on the face of housing 50, such as "Safe," "Caution," "Clean," and "Replace," thereby indicating various possible conditions of the filtering media.

By the foregoing I have provided an arrangement for continuously sensing and indicating to an operator the actual flow conditions of an air induction system in an operating internal combustion engine. With this information as to the actual condition of the filtering media, replacement of or correction of malfunction therein may be rapidly corrected before more serious difficulties occur.

It is to be understood that my invention is equally applicable to other types of air induction systems than those of automobiles; and that variations in design and fabrication of parts may be had that would be equally within the concepts of the invention.

Having thus described my invention with sufficient particularity and detail as to enable those skilled in the art to practice it, what I desire to have protected by Letters Patent is set forth in the following claims:

1. An arrangement for continuously sensing and indicating the flow conditions of the filtering medium of the air induction system of an internal combustion engine comprising, in combination, an adapter assembly and an indicating assembly, said adapter assembly being a body adapted to be threaded on a stud to replace the normal wing nut fastening device of a casing enclosing said filter medium, a chamber formed in said body only in communication with the interior of the casing, means defining a first passage from said chamber to without the confines of said body, seal means adapted to form an air-tight seal for said chamber when said body is tightened in place on said casing, said indicating assembly including an elongated chamber defining the range of travel of a movable indicator device, a movable indicator device reciprocably mounted in said elongated chamber, a second passage on one end of said indicator assembly communicating through the indicating assembly to the atmosphere, a third passage on the opposite end of and in communication with said indicator assembly and communicating with the exterior of said indicating assembly, flexible conduit means interconnecting said third passage and said first passage of the adapter whereby said indicator assembly is in communication on the one side with only the suction side of said filter medium and on the other side with the atmosphere so that pressure drops across the filtering medium are applied to the movable indicating device to move it to indicate the flow conditions through the filtering medium.

2. An arrangement for continuously sensing and indicating the flow conditions of the filtering medium of the air induction system of an internal combustion engine comprising, in combination, an adapter assembly and an indicating assembly, said adapter assembly being a body adapted to be threaded on a stud to replace the normal wing nut fastening device of a casing enclosing said filter medium, a chamber formed in said body only in communication with the interior of the casing, means defining a first passage from said chamber to without the confines of said body, seal means adapted to form an airtight seal for said chamber when said body is tightened in place on said casing, said indicating assembly including an elongated chamber defining the range of travel of a movable indicator device, a movable indicator device reciprocably mounted in said chamber, a second passage on one end of said indicator assembly communicating through the indicating assembly to the atmosphere, a third passage on the opposite end of and in communication with said indicator assembly and communicating with the exterior of said indicating assembly, flexible conduit means interconnecting said third passage and said first passage of the adapter whereby said indicator assembly is in communication on the one side with only the suction side of said filter medium and on the other side with the atmosphere so that pressure drops across the filtering medium are applied to the movable indicating device to move it to indicate the flow conditions through the filtering medium, and attaching means carried by said indicating assembly adapted to hold it on an adjacent surface.

3. The arrangement of claim 2 in which the attaching means are magnets arranged to hold the indicating assembly on an adjacent metal surface.

References Cited in the file of this patent

UNITED STATES PATENTS

| 1,947,923 | Schweitzer | Feb. 20, 1934 |
| 2,811,808 | Briese | Nov. 5, 1957 |
| 2,954,751 | Barnes | Oct. 4, 1960 |
| 2,969,605 | Garvin | Jan. 31, 1961 |
| 3,095,866 | Dionne | July 2, 1963 |

FOREIGN PATENTS

| 345,440 | Great Britain | Mar. 26, 1931 |